US009013803B2

(12) United States Patent
Morooka

(10) Patent No.: US 9,013,803 B2
(45) Date of Patent: Apr. 21, 2015

(54) ZOOM LENS AND IMAGE PICKUP APPARATUS EQUIPPED WITH SAME

(71) Applicant: Olympus Imaging Corp., Tokyo (JP)

(72) Inventor: Masaru Morooka, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 2 days.

(21) Appl. No.: 14/045,304

(22) Filed: Oct. 3, 2013

(65) Prior Publication Data

US 2014/0146217 A1 May 29, 2014

(30) Foreign Application Priority Data

Nov. 28, 2012 (JP) ................................ 2012-260216

(51) Int. Cl.
G02B 15/20 (2006.01)
G02B 13/18 (2006.01)
G03B 17/17 (2006.01)
G02B 13/00 (2006.01)
G02B 15/173 (2006.01)

(52) U.S. Cl.
CPC ........ G02B 13/0045 (2013.01); G02B 13/0065 (2013.01); G02B 13/009 (2013.01); G02B 15/173 (2013.01)

(58) Field of Classification Search
CPC .... G02B 15/14; G02B 15/173; G02B 13/009; G02B 13/0065; H04N 5/225
USPC .................................. 348/345; 359/683, 684
See application file for complete search history.

(56) References Cited

U.S. PATENT DOCUMENTS

| 5,933,281 | A | 8/1999 | Suzuki | |
|---|---|---|---|---|
| 6,025,962 | A | 2/2000 | Suzuki | |
| 7,307,797 | B2 * | 12/2007 | Yoshitsugu et al. | 359/689 |
| 7,369,326 | B2 * | 5/2008 | Yagyu et al. | 359/689 |
| 7,426,084 | B2 * | 9/2008 | Bito et al. | 359/784 |
| 7,463,426 | B2 * | 12/2008 | Nishio | 359/683 |
| 7,688,519 | B2 | 3/2010 | Ito | |

(Continued)

FOREIGN PATENT DOCUMENTS

| JP | Sho 60-039613 | 3/1985 |
|---|---|---|
| JP | Hei 01-191819 | 8/1989 |

(Continued)

OTHER PUBLICATIONS

NPL Machine Translation of the Original Claims filed for JP 2012-260216 on Jan. 28, 2012.*

(Continued)

Primary Examiner — David N Spector
(74) Attorney, Agent, or Firm — Kenyon & Kenyon LLP

(57) ABSTRACT

A zoom lens includes, in order from the object side to the image side along its optical path, a first lens unit having a positive refractive power, a second lens unit having a negative refractive power and including a prism reflecting member, a third lens unit having a positive refractive power, a fourth lens unit having a negative refractive power, and a fifth lens unit having a positive refractive power, wherein the distances between the lens units vary during zooming from the wide angle end to the telephoto end, the first lens unit and the third lens unit are located closer to the ray incidence side at the telephoto end than at the wide angle end, the position of the second lens unit is fixed during zooming from the wide angle end to the telephoto end.

35 Claims, 9 Drawing Sheets

(56) References Cited

U.S. PATENT DOCUMENTS

| | | | |
|---|---|---|---|
| 7,889,436 B2 * | 2/2011 | Wada | 359/676 |
| 7,920,332 B2 | 4/2011 | Ohtake | |
| 7,982,970 B2 | 7/2011 | Wada | |
| 8,149,515 B2 | 4/2012 | Wada | |
| 8,254,037 B2 | 8/2012 | Ohtake | |
| 8,687,283 B2 | 4/2014 | Wada | |
| 2010/0220398 A1 | 9/2010 | Ohtake | |
| 2011/0157721 A1 | 6/2011 | Ohtake | |
| 2012/0019929 A1 | 1/2012 | Fujisaki | |
| 2013/0100325 A1 | 4/2013 | Wada | |

FOREIGN PATENT DOCUMENTS

| | | |
|---|---|---|
| JP | Hei 10-111456 | 4/1998 |
| JP | Hei 10-111457 | 4/1998 |
| JP | 2004-226643 | 8/2004 |
| JP | 2004-226644 | 8/2004 |
| JP | 2007 219040 | 8/2007 |
| JP | 2008-039838 | 2/2008 |
| JP | 2008-089690 | 4/2008 |
| JP | 2008-139754 | 6/2008 |
| JP | 2010-048855 | 3/2010 |
| JP | 2010-204178 | 9/2010 |
| JP | 2011-013281 | 1/2011 |
| JP | 2011-133815 | 7/2011 |
| JP | 2012-027084 | 2/2012 |
| JP | 2013-092554 | 5/2013 |

OTHER PUBLICATIONS

NPL Machine Translation of Notification of Reasons for Refusal prepared for JP 2012-260216 on May 28, 2014.*

NPL Machine Translation of Written Arguments prepared for JP 2012-260216 on Jul. 1, 2014.*

NPL Machine Translation of Written Amendments prepared for JP 2012-260216 on Jul. 1, 2014.*

Japanese Office Action from Application No. JP 2012-260216, dated Jun. 4, 2014.

* cited by examiner

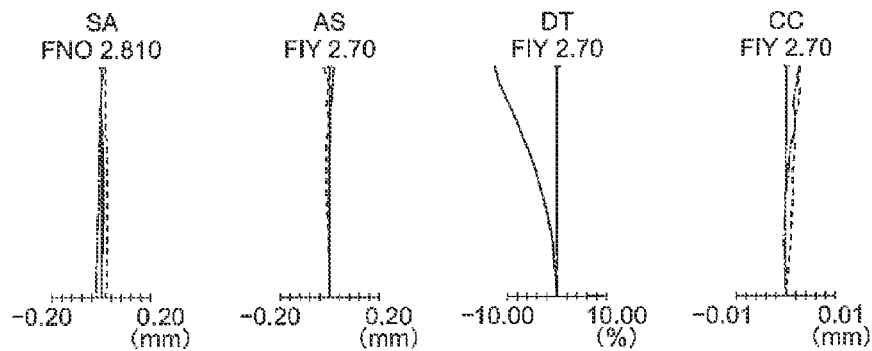
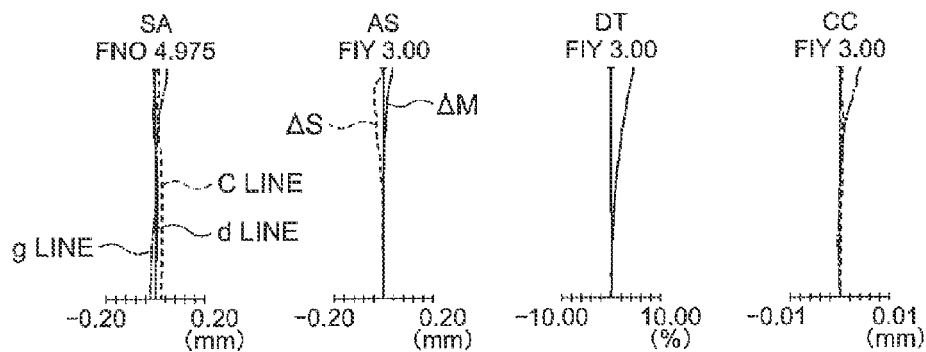
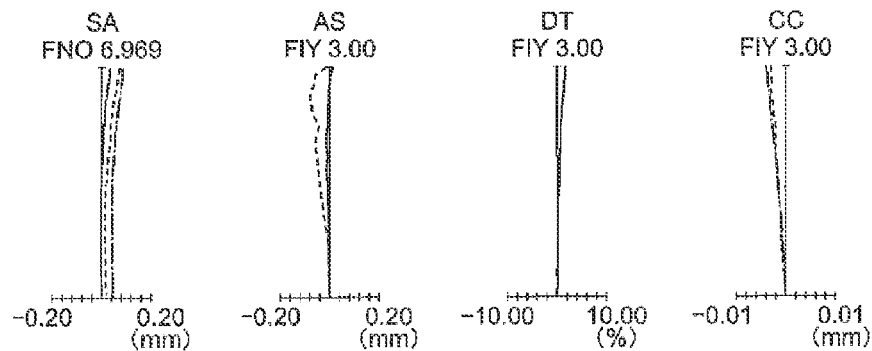

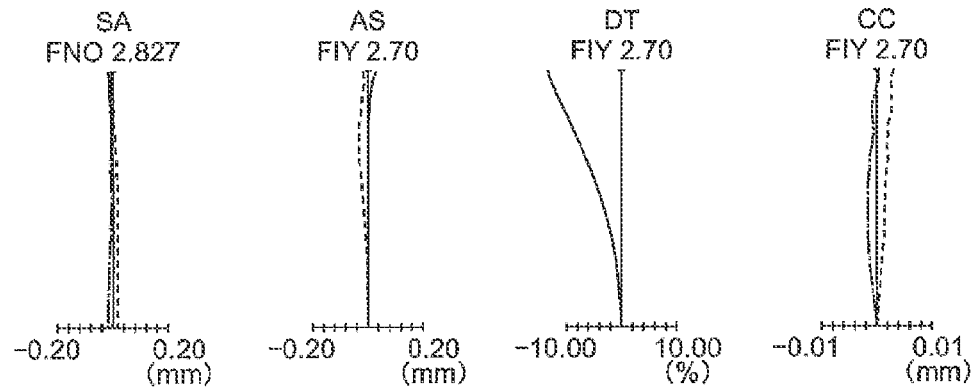
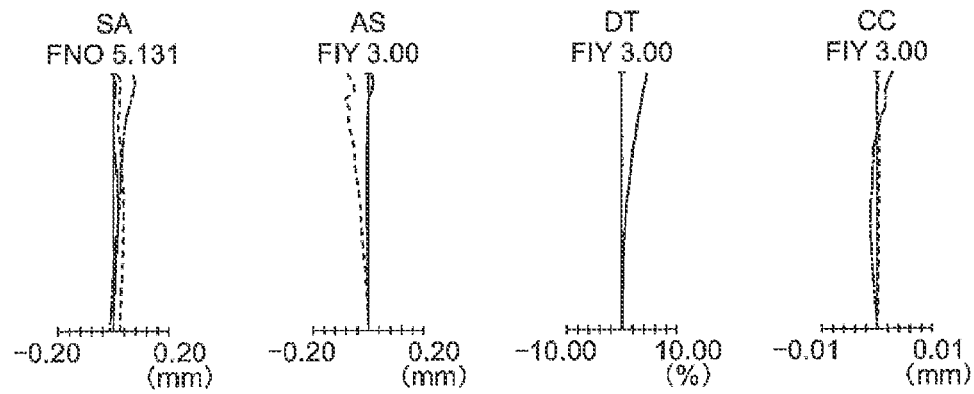
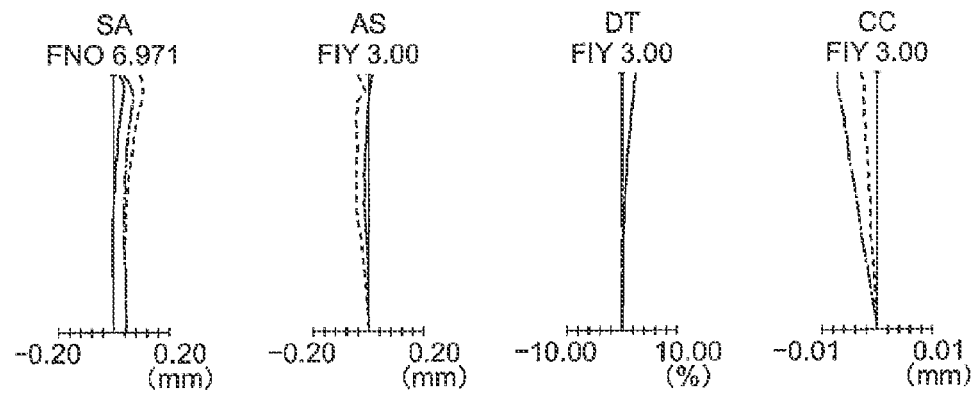

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2012-260216 filed on Nov. 28, 2012; the entire contents of which are incorporated herein by reference.

BACKGROUND OF THE INVENTION

1. Field of the Invention

The present invention relates to a zoom lens having a prism reflecting member that bends the optical path and an image pickup apparatus equipped with the same.

2. Description of the Related Art

With increasing variety of uses of video cameras and digital cameras in image shooting in recent years, they are demanded to have higher performance, such as wider angle of views and higher zoom ratios. On the other hand, size reduction and slimming of zoom lenses used in cameras are also demanded.

To reduce the thickness of a camera, a zoom lens having a reflecting prism that bends its optical path has been developed. Examples of such a zoom lens are disclosed in Japanese Patent Application Laid-Open Nos. 2010-048855, 2011-013281 and 2012-027084. In the zoom lenses disclosed in these patent literatures, the reflecting prism is arranged between a plurality of lens units that move during zooming to enable slimming of the camera when not in use and to help to increase the zoom ratio.

SUMMARY OF THE INVENTION

A zoom lens according to a first aspect of the present invention comprises, in order from the object side to the image side along its optical path, a first lens unit having a positive refractive power, a second lens unit having a negative refractive power and including a prism reflecting member having an entrance refracting surface, an exit refracting surface, and a reflecting surface disposed in the optical path between the entrance refracting surface and the exit refracting surface and oriented obliquely to the optical axis to bend the optical path, a third lens unit having a positive refractive power, a fourth lens unit having a negative refractive power, and a fifth lens unit having a positive refractive power, wherein the distances between the lens units vary during zooming from the wide angle end to the telephoto end, the first lens unit and the third lens unit are located closer to the ray incidence side at the telephoto end than at the wide angle end, the position of the second lens unit is fixed during zooming from the wide angle end to the telephoto end, and the following conditional expression (1) is satisfied:

$$-10 < f_1/f_2 < -5 \tag{1},$$

where $f_1$ is the focal length of the first lens unit, and $f_2$ is the focal length of the second lens unit.

A zoom lens according to a second aspect of the present invention comprises, in order from the object side to the image side along its optical path, a first lens unit having a positive refractive power, a second lens unit having a negative refractive power and including a prism reflecting member having an entrance refracting surface, an exit refracting surface, and a reflecting surface disposed in the optical path between the entrance refracting surface and the exit refracting surface and oriented obliquely to the optical axis to bend the optical path, a third lens unit having a positive refractive power, a fourth lens unit having a negative refractive power, and a fifth lens unit having a positive refractive power, wherein the distances between the lens units vary during zooming from the wide angle end to the telephoto end, the first lens unit and the third lens unit are located closer to the ray incidence side at the telephoto end than at the wide angle end, the position of the second lens unit is fixed during zooming from the wide angle end to the telephoto end, and the following conditional expression (6) is satisfied:

$$11.0 < f_t/f_w < 40.0 \tag{6},$$

where $f_t$ is the focal length of the entire zoom lens system at the telephoto end in the state in which the zoom lens is focused at infinity, and $f_w$ is the focal length of the entire zoom lens system at the wide angle end in the state in which the zoom lens is focused at infinity.

A zoom lens according to a third aspect of the present invention comprises, in order from the object side to the image side along its optical path, a first lens unit having a positive refractive power, a second lens unit having a negative refractive power and including a prism reflecting member having an entrance refracting surface, an exit refracting surface, and a reflecting surface disposed in the optical path between the entrance refracting surface and the exit refracting surface and oriented obliquely to the optical axis to bend the optical path, a third lens unit having a positive refractive power, a fourth lens unit having a negative refractive power, and a fifth lens unit having a positive refractive power, wherein the distances between the lens units vary during zooming from the wide angle end to the telephoto end, the first lens unit and the third lens unit are located closer to the ray incidence side at the telephoto end than at the wide angle end, the position of the second lens unit is fixed during zooming from the wide angle end to the telephoto end, and the first lens unit includes two lenses at most.

A zoom lens according to a fourth aspect of the present invention comprises, in order from the object side to the image side along its optical path, a first lens unit having a positive refractive power, a second lens unit having a negative refractive power and comprising a prism reflecting member having an entrance refracting surface, an exit refracting surface, and a reflecting surface disposed in the optical path between the entrance refracting surface and the exit refracting surface and oriented obliquely to the optical axis to bend the optical path, a third lens unit having a positive refractive power, a fourth lens unit having a negative refractive power, and a fifth lens unit having a positive refractive power, wherein the distances between the lens units vary during zooming from the wide angle end to the telephoto end, the first lens unit and the third lens unit are located closer to the ray incidence side at the telephoto end than at the wide angle end, the position of the second lens unit is fixed during zooming from the wide angle end to the telephoto end, the fourth lens unit moves toward the image side during focusing from infinity to a very short distance, and the fourth lens unit consists of one negative lens.

A zoom lens according to a fifth aspect of the present invention comprises, in order from the object side to the image side along its optical path, a first lens unit having a positive refractive power, a second lens unit having a negative refractive power and comprising a prism reflecting member having an entrance refracting surface, an exit refracting surface, and a reflecting surface disposed in the optical path between the entrance refracting surface and the exit refracting surface and oriented obliquely to the optical axis to bend the optical path, and a succeeding lens unit comprising at least one lens unit having a positive refractive power, wherein during zooming from the wide angle end to the telephoto end, the distances between the lens units vary, the first lens unit is located closer to the ray incidence side at the telephoto end than at the wide angle end, the position of the second lens unit is fixed during zooming from the wide angle end to the telephoto end, and the following conditional expressions (1), (2), and (3) are satisfied:

$$-10 < f_1/f_2 < -5 \quad (1),$$

$$3 \le f_1/f_w < 7.2 \quad (2), \text{ and}$$

$$3.5 < d_{1g}/f_w < 7 \quad (3),$$

where $f_1$ is the focal length of the first lens unit, $f_2$ is the focal length of the second lens unit, $f_w$ is the focal length of the entire zoom lens system at the wide angle end in the state in which the zoom lens is focused at infinity, and $d_{1g}$ is the amount of displacement of the position of the first lens unit at the telephoto end from its position at the wide angle end.

An image pickup apparatus according to the present invention comprises any one of the above-described zoom lenses and an image pickup element that converts an image formed by the zoom lens into an electrical signal.

BRIEF DESCRIPTION OF THE DRAWINGS

FIG. 1A shows the state at the wide angle end, FIG. 1B shows an intermediate focal length state, and FIG. 1C shows the state at the telephoto end;

FIG. 2A shows the state at the wide angle end, FIG. 2B shows an intermediate focal length state, and FIG. 2C shows the state at the telephoto end;

FIGS. 3A to 3L are aberration diagrams of the zoom lens according to the first example in the state in which the zoom lens is focused on an object point at infinity;

FIGS. 4A to 4L are aberration diagrams of the zoom lens according to the second example in the state in which the zoom lens is focused on an object point at infinity;

FIG. 5A is a cross sectional view in the state in which the focal length of the zoom lens is set to the wide angle end, and FIG. 5B is a cross sectional view in the state in which the zoom lens is collapsed;

DETAILED DESCRIPTION OF THE INVENTION

Figure 1A:
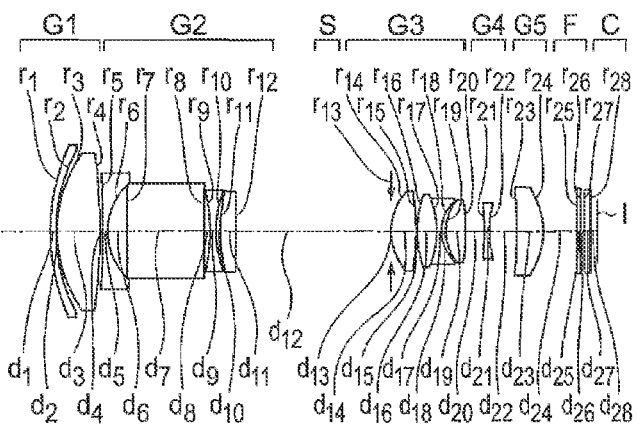
FIGS. 1A, 1B, and 1C are cross sectional views taken along the optical axis, showing the configuration of a zoom lens according to a first example of the present invention in the state in which the zoom lens is focused on an object point at infinity, where

In the following, embodiments of the zoom lens and the image pickup apparatus equipped with the same according to the present invention will be described in detail with reference to the drawings. It should be understood, however, that the present invention is by no means limited by the embodiments.

Prior to the description of examples, the operation and advantages of the zoom lens according to some embodiments of the present invention will be described.

A zoom lens according to an embodiment of the present invention includes, in order from the object side to the image side along its optical path, a first lens unit having a positive refractive power, a second lens unit having a negative refractive power and including a prism reflecting member having an entrance refracting surface, an exit refracting surface, and a reflecting surface disposed in the optical path between the entrance refracting surface and the exit refracting surface and oriented obliquely to the optical axis to bend the optical path, and a succeeding lens unit including at least one lens unit having a positive refractive power, wherein during zooming from the wide angle end to the telephoto end, the distances between the lens units vary, the first lens unit is located closer to the ray incidence side at the telephoto end than at the wide angle end, and the position of the second lens unit is fixed during zooming from the wide angle end to the telephoto end.

In this embodiment, a positive-lead type zoom lens design in which the lens unit located closest to the object side has a positive refractive power is adopted. This lens configuration helps to achieve an adequate zoom ratio and is an advantageous lens configuration in a zoom lens having a wide angle of view and a high zoom ratio.

Zooming is mainly achieved by varying the distance between the first lens unit and the second lens unit and the distance between the second lens unit and the succeeding lens unit.

In this embodiment, the prism reflecting member that bends the optical path of rays coming from the object side is provided in the second lens unit. During zooming, the second lens unit including the prism reflecting member is fixed, and zooming is achieved by moving the first lens unit and the succeeding lens unit arranged on the image side of the second lens unit in such a way as to vary the distances between the lens units.

With the above features, a high zoom ratio is achieved, and when the zoom lens is used in a camera, the thickness of the camera (i.e. the length of the camera along the front-rear direction) can be made small.

It is more preferred that the zoom lens according to this embodiment also have any one of the following features.

In the zoom lens according to this embodiment of the present invention, it is preferred that the succeeding lens unit includes a third lens unit having a positive refractive power, a fourth lens unit having a negative refractive power, and a fifth lens unit having a positive refractive power, and that during zooming from the wide angle end to the telephoto end, the distances between the lens units vary and the first lens unit and the third lens unit be located closer to the ray incidence side at the telephoto end than at the wide angle end.

Thus, the zoom lens includes, in order from the object side, the first lens unit having a positive refractive power, the second lens unit having a negative refractive power, the third lens unit having a positive refractive power, the fourth lens unit having a negative refractive power, and the fifth lens unit having a positive refractive power. This configuration is advantageous in further increasing the zoom ratio and reducing the size.

Zooming can mainly be achieved by varying the distance between the first lens unit and the second lens unit, the distance between the second lens unit and the third lens unit, and the distance between the third lens unit and the fourth lens unit.

Providing the fourth lens unit having a negative refractive power on the image side of the third lens unit allows the first to third lens units to have a high composite refractive power, further facilitating reduction in the size of the entire zoom lens system.

Moreover, providing the fifth lens unit having a positive refractive power can lead to an appropriate position of the exit pupil, allowing reduction in the size of the first or fourth lens unit. This is advantageous for small-size zoom lens design.

During zooming, while the distance between the first lens unit and the second lens unit is increased to vary the magnification, the distance between the second lens unit and the third lens unit is decreased. This can help to prevent the exit pupil from being located too far from the first lens surface at the telephoto end, thereby facilitating reduction in the lens diameter in the first lens unit.

As the third lens unit is moved, both the third and second lens units can contribute to the variation of the magnification, and therefore the amount of movement of the first lens unit during zooming can be made smaller. This helps reduction of the overall length of the zoom lens at the telephoto end.

Moreover, it is preferred that the third, fourth, and fifth lens units move in such a way that the distance between the third lens unit and the fourth lens unit and the distance between the fourth lens unit and the fifth lens unit both be larger at the telephoto end than at the wide angle end. This is advantageous for achieving a high zoom ratio.

In the zoom lens according to the embodiment of the present invention, it is preferred that the succeeding lens unit include, in order along the optical path, a third lens unit having a positive refractive power, a fourth lens unit having a negative refractive power, and a fifth lens unit having a positive refractive power, and that distances between the lens units vary during zooming from the wide angle end to the telephoto end.

It is preferred that the zoom lens according to the embodiment satisfy the following conditional expression (1):

$$-10 < f_1/f_2 < -5 \tag{1}$$

where $f_1$ is the focal length of the first lens unit, and $f_2$ is the focal length of the second lens unit.

Conditional expression (1) limits the value of the ratio of the focal length of the first lens unit and the focal length of the second lens unit. Satisfying conditional expression (1) is preferable for excellent correction of aberrations of the entire zoom lens system with a high zoom ratio and for size reduction.

If the refractive power of the first lens unit is relatively low so that the value of the term $f_1/f_2$ in conditional expression (1) does not fall below the lower limit, aberrations generated in the first lens unit can be reduced, helping sufficient correction throughout the entire zoom range.

If the refractive power of the first lens unit is relatively high so that the value of the term $f_1/f_2$ in conditional expression (1) does not exceed the upper limit, the amount of movement of the first lens unit for zooming can be made small, helping size reduction.

It is preferred that the zoom lens according to the embodiment of the present invention satisfy the following conditional expression (2):

$$3 < f_1/f_w < 7.2 \tag{2}$$

where $f_w$ is the focal length of the entire zoom lens system at the wide angle end in the state in which the zoom lens is focused at infinity.

Conditional expression (2) limits the focal length of the first lens unit. Satisfying conditional expression (2) is advantageous for achieving both size reduction throughout the entire zoom range and a high zoom ratio.

It is preferred that the refractive power of the first lens unit be so low that the value of the term $f_1/f_w$ in conditional expression (2) does not fall below the lower limit. This helps reduction of chromatic aberration of magnification at the wide angle end, when the zoom lens has a wide angle of view. This also helps reduction of axial chromatic aberration and chromatic aberration of magnification at the telephoto end, when the zoom lens has a high zoom ratio.

It is preferred that the refractive power of the first lens unit be so high that the value of the term $f_1/f_w$ in conditional expression (2) does not exceed the upper limit. This allows making the amount of movement of the first lens unit for zooming small, helping size reduction and facilitating correction of spherical aberration at the telephoto end.

It is preferred that the zoom lens according to the embodiment of the present invention satisfy the following conditional expression (3):

$$3.5 < d_{1g}/f_w < 7 \tag{3}$$

where $d_{1g}$ is the amount of displacement of the position of the first lens unit at the telephoto end from its position at the wide angle end.

Conditional expression (3) appropriately limits the amount of movement of the first lens unit along the optical axis. Satisfying conditional expression (3) facilitates slimming the zoom lens system while achieving a high zoom ratio.

If the amount of displacement of the first lens unit is so large that the value of the term $d_{1g}/f_w$ in conditional expression (3) does not fall below the lower limit, it is possible to make the refractive power of the first lens unit lower, helping reduction of variation in aberration with zooming.

If the amount of displacement of the first lens unit is so small that the value of the term $d_{1g}/f_w$ in conditional expression (3) does not exceed the upper limit, the overall length of the zoom lens at the telephoto end can be made short. For example, in the case where the first lens unit is adapted to collapse toward the camera body so as to be received therein, the length of a frame to be collapsed can be made short, allowing slimming of the camera with respect to the thickness direction.

It is preferred that the zoom lens according to the embodiment of the present invention satisfy the following conditional expression (4):

$$1.8 < N_{2r} < 2.3 \tag{4}$$

where $N_{2r}$ is the refractive index of the prism reflecting member in the second lens unit with respect to the d-line.

Conditional expression (4) appropriately limits the value of the refractive index of the prism reflecting member in the second lens unit to facilitate reduction in the size of the zoom lens.

If the refractive index of the prism reflecting member is so large that the value of the term $N_{2r}$ in conditional expression (4) does not fall below the lower limit, the ray height of off-axis rays in the first lens unit can be made low, particularly at the wide angle end, helping reduction of the size of the first lens unit. This leads to slimming of the camera with respect to the thickness direction.

If the refractive index of the prism reflecting member is moderately low so that the value of the term $N_{2r}$ in conditional expression (4) does not exceeding the upper limit, the dispersion of the material of the prism can be made small. This helps reduction of chromatic aberration of magnification attributed to the prism member, at the telephoto end.

In the zoom lens according to the embodiment of the present invention, it is preferred that the first lens unit consist, in order from the object side to the image side, of a negative lens and at least one positive lens having an Abbe constant with respect to the d-line larger than that of the negative lens and satisfy the following conditional expression (5):

$$70 < \nu_{1p} \quad (5),$$

where $\nu_{1p}$ is the Abbe constant with respect to the d-line of a positive lens among the at least one positive lens in the first lens unit, the Abbe constant $\nu_{1p}$ being expressed by $\nu_{1p} = (n_{d1p}-1)/(n_{F1p}-n_{C1p})$, where $n_{d1p}$ is the refractive index of the aforementioned positive lens with respect to the d-line, $n_{C1p}$ is the refractive index of the aforementioned positive lens with respect to the C-line, and $n_{F1p}$ is the refractive index of the aforementioned positive lens with respect to the F-line.

To achieve a high zoom ratio and small size, it is preferred that the first lens unit have a somewhat high refractive power. The first lens unit needs to include at least one positive lens.

It is desirable that the first lens unit include a negative lens for the purpose of correction of chromatic aberration and that the negative lens and the positive lens in the first lens unit be arranged in this order from the object side to provide an appropriate back focus of the first lens unit.

Furthermore, a long focal length at the telephoto end tends to lead to large first-order chromatic aberration (including axial chromatic aberration and chromatic aberration of magnification) generated in the first lens unit. To achieve correction of such first-order chromatic aberrations, it is preferred that the negative lens be made of an optical material having high dispersion and the at least one positive lens be made of an optical material having low dispersion satisfying conditional expression (5).

In the zoom lens according to the embodiment of the present invention, it is preferred that the fourth lens unit move toward the image side during focusing from infinity to a very short distance.

This can make variation of aberrations with focusing small.

Moreover, it is preferred that the fourth lens unit consists of one negative lens.

This allows the focusing lens unit to be light in weight, helping reduction of noise generated during focusing.

It is preferred that the zoom lens according to the embodiment of the present invention satisfy the following conditional expression (6):

$$11.0 < f_t/f_w < 40.0 \quad (6),$$

where $f_t$ is the focal length of the entire zoom lens system at the telephoto end in the state in which the zoom lens is focused at infinity.

If the zoom ratio is so high that the value of the term $f_t/f_w$ in conditional expression (6) does not fall below the lower limit, advantages of the configuration of this embodiment in slimming the zoom lens and achieving an adequate zoom ratio can be sufficiently enjoyed.

If the zoom ratio is moderately low so that the value of the term $f_t/f_w$ in conditional expression (6) does not exceed the upper limit, the amount of movement of the first lens unit can be made small or the thickness of the first lens unit can be made small, helping slimming of the camera.

In the zoom lens according to the embodiment of the present invention, it is preferred that the first lens unit include two lenses at most.

This allows the first lens unit to have a small thickness, helping slimming of the camera.

It is preferred that the second lens unit and the third lens unit are shifted toward the image side from their positions at the wide angle end to allow the first lens unit to collapse into a space generated by the shift of the second lens unit. This helps slimming of the optical system when not in use.

An image pickup apparatus according to an embodiment of the present invention includes a zoom lens according to any one of the above described zoom lenses and an image pickup element that converts an image formed by the zoom lens into an electrical signal.

It is preferred that two or more of the above described features be adopted in combination.

It is preferred that the upper and/or lower limit values in the conditional expressions presented in the foregoing be further limited as follows in order that the advantages can be enjoyed more surely.

In conditional expression (1), it is more preferred that the lower limit value be −8, still more preferably −6, and the upper limit value be −5.3, still more preferably −5.6.

In conditional expression (2), it is more preferred that the lower limit value be 4.5, still more preferably 6, and the upper limit value be 7.0, still more preferably 6.9.

In conditional expression (3), it is more preferred that the lower limit value be 3.6, and the upper limit value be 6, still more preferably 4.

In conditional expression (4), it is more preferred that the lower limit value be 1.9, still more preferably 2.0, and the upper limit value be 2.2, still more preferably 2.1.

In conditional expression (5), it is more preferred that the lower limit value be 75, still more preferably 80.

In conditional expression (6), it is more preferred that the lower limit value be 15, still more preferably 18, and the upper limit value be 30, still more preferably 25.

EXAMPLES

Zoom lenses according to the following examples are all small in size and can suitably be used in cameras such as digital still cameras having high image quality, digital video cameras, and portable information terminals having image taking functions. All the zoom lenses have high zoom ratios and their thicknesses at the wide angle end and in the collapsed state can be made small. In all the zoom lenses, a lens barrel used to move the first lens unit can be designed to be short in length, and the zoom lenses can be used in image pickup apparatuses (such as cameras) having lens barrels.

Figure 1B:
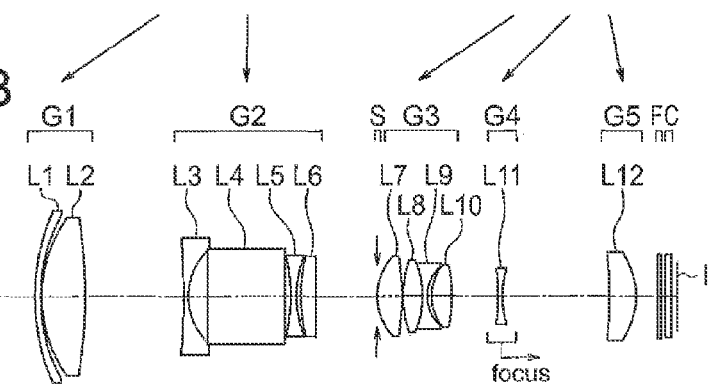
Figure 1C:
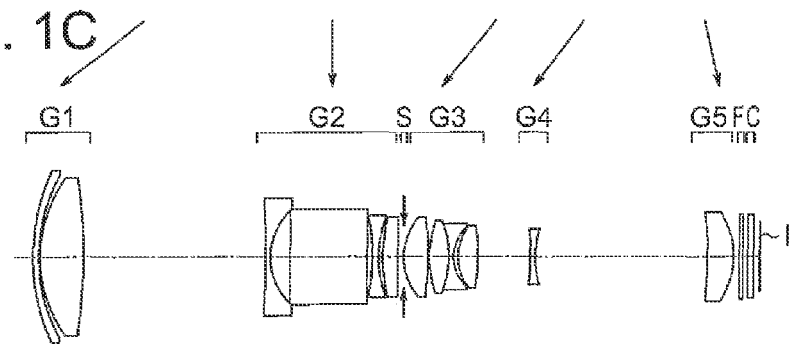
Figure 2A:
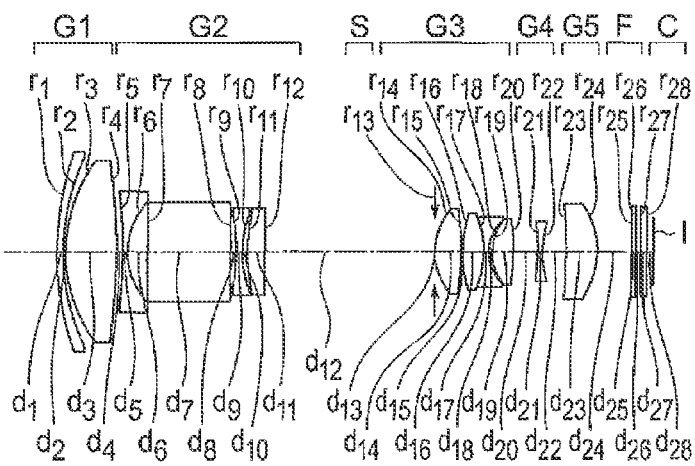
FIGS. 2A, 2B, and 2C are cross sectional views taken along the optical axis, showing the configuration of a zoom lens according to a second example of the present invention in the state in which the zoom lens is focused on an object point at infinity, where
Figure 2B:
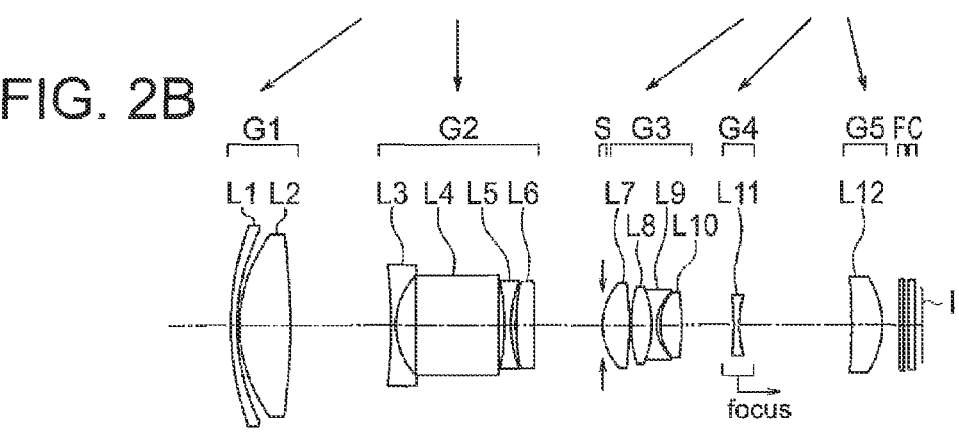
Figure 2C:
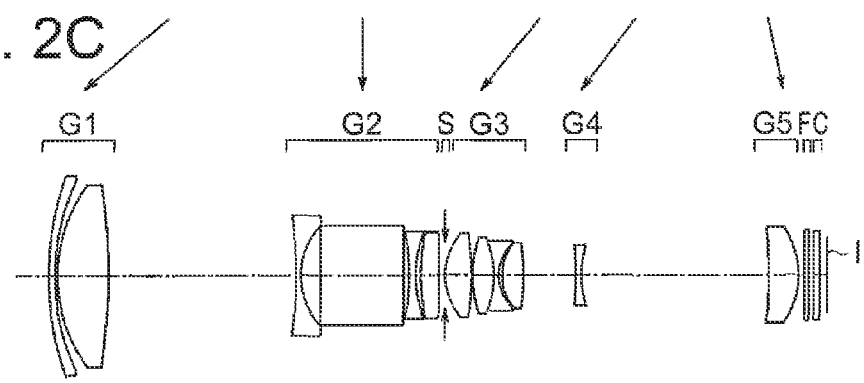

In the following, first and second examples of the zoom lens according to the present invention will be described. FIGS. 1A, 1B, and 1C are cross sectional views taken along the optical axis, showing the configuration of a zoom lens according to the first example of the present invention in the state in which the zoom lens is focused on an object point at infinity, where FIG. 1A shows the state at the wide angle end, FIG. 1B shows an intermediate focal length state, and FIG. 1C shows the state at the telephoto end. FIGS. 2A, 2B, and 2C are cross sectional views taken along the optical axis, showing the configuration of a zoom lens according to the second example of the present invention in the state in which the zoom lens is focused on an object point at infinity, where FIG. 2A shows the state at the wide angle end, FIG. 2B shows the state in an intermediate focal length state, and FIG. 2C shows the state at the telephoto end. In FIGS. 1A, 1B, 1C, 2A, 2B, and 2C, a first lens unit is denoted by G1, a second lens unit is denoted by G2, a third lens unit is denoted by G3, a fourth lens unit is denoted by G4, a fifth lens unit is denoted by G5, an aperture stop is denoted by S, a plane parallel plate constituting a low pass filter on which wavelength restriction coating for blocking or reducing infrared light is applied is denoted by F, a plane parallel plate constituting a cover glass for an electronic image pickup element is denoted by C, and the image plane is denoted by I. A multi-layer coating for wavelength restriction may be applied to the surface of the cover glass C. The cover glass C may be adapted to have a low pass filtering effect.

In the zoom lens according to each example, the aperture stop S moves integrally with the third lens unit G3. All the numerical data of the examples presented below are for the state in which the zoom lenses are focused on an object at infinity. In the numerical data, dimensions are in millimeters and angles are in degrees. In all the examples, focusing from infinity to a very short distance is performed by moving the fourth lens unit G4 toward the image side. Zoom data will be given for the wide angle end (WE), for the intermediate focal length state (ST), and for the telephoto end (TE).

As shown in FIGS. 1A, 1B, and 1C, the zoom lens according to the first embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 is fixed or stationary, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a prism L4 (P), a biconcave negative lens L5, and a planer-convex positive lens L6 having a convex surface directed toward the object side. The third lens unit G3 is composed of a biconvex positive lens L7, a biconvex positive lens L8, a biconcave negative lens L9, and a biconvex positive lens L10. The biconvex positive lens L8 and the biconcave negative lens L9 are cemented together. The fourth lens unit G4 is composed of a biconcave negative lens L11. The fifth lens unit G5 is composed of a positive meniscus lens L12 having a convex surface directed toward the image side. The lens elements in each lens unit are arranged in the mentioned order from the object side.

There are ten aspheric surfaces, which include both surfaces of the biconvex positive lens L2, both surfaces of the biconcave negative lens L5, both surfaces of the biconvex positive lens L7, both surfaces of the biconvex positive lens L10, and both surfaces of the positive meniscus lens L12.

As shown in FIGS. 2A, 2B, and 2C, the zoom lens according to the second embodiment includes, in order from the object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power.

During zooming from the wide angle end to the telephoto end, the first lens unit G1 moves toward the object side, the second lens unit G2 is stationary, the third lens unit G3 moves toward the object side, the fourth lens unit G4 moves toward the object side, the fifth lens unit G5 moves toward the image side, and the aperture stop S moves toward the object side.

The first lens unit G1 is composed of a negative meniscus lens L1 having a convex surface directed toward the object side and a biconvex positive lens L2. The second lens unit G2 is composed of a biconcave negative lens L3, a prism L4 (P), a biconcave negative lens L5, and a planer-convex positive lens L6 having a convex surface directed toward the object side. The third lens unit G3 is composed of a biconvex positive lens L7, a biconvex positive lens L8, a biconcave negative lens L9, and a biconvex positive lens L10. The biconvex positive lens L8 and the biconcave negative lens L9 are cemented together. The fourth lens unit G4 is composed of a biconcave negative lens L11. The fifth lens unit G5 is composed of a positive meniscus lens L12 having a convex surface directed toward the image side. The lens elements in each lens unit are arranged in the mentioned order from the object side.

There are ten aspheric surfaces, which include both surfaces of the biconvex positive lens L2, both surfaces of the biconcave negative lens L5, both surfaces of the biconvex positive lens L7, both surfaces of the biconvex positive lens L10, and both surfaces of the positive meniscus lens L12.

Figure 8:
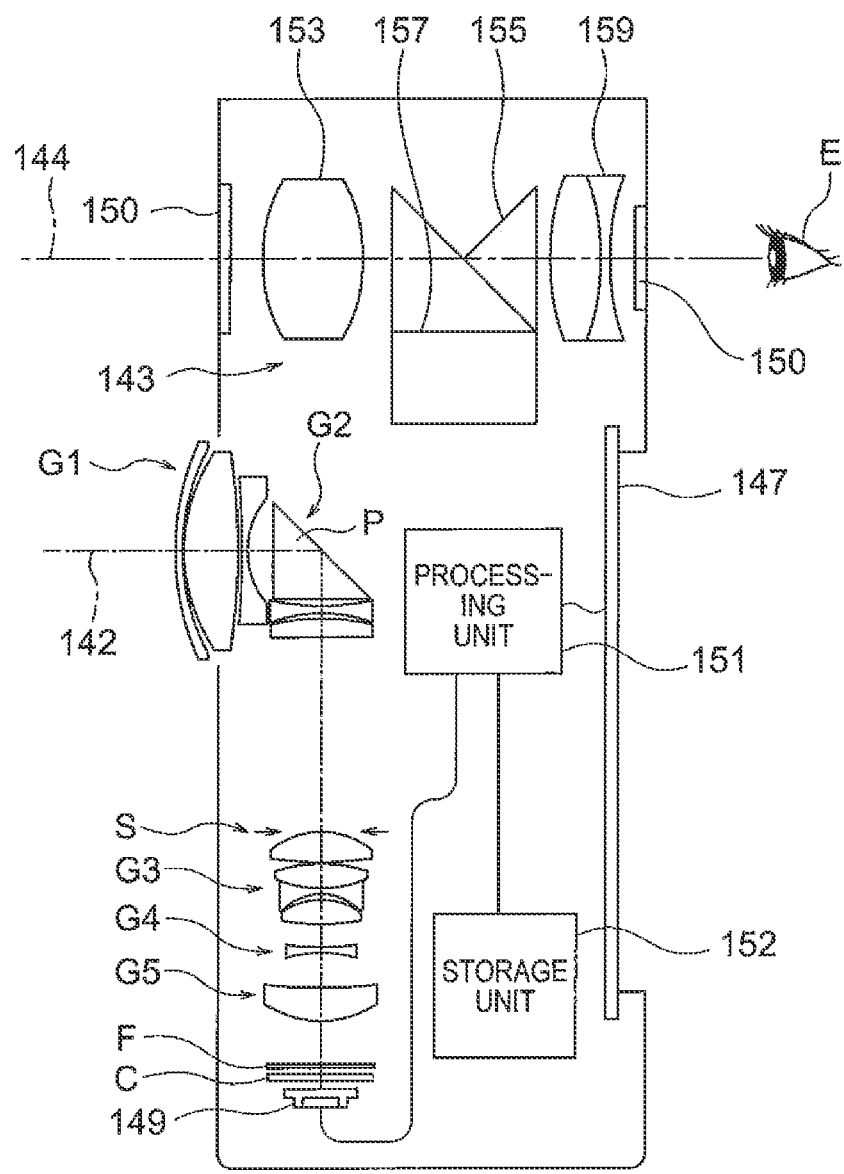
FIG. 8 is a cross sectional view of the digital camera.

FIGS. 1A to 1C and 2A to 2C are developed views in which the reflecting surface of the prism is not illustrated. Actually, the prism is a rectangular prism as shown in FIG. 8. Although not described in the numerical data, there is a reflecting surface inclined to the optical axis by 45 degrees, between the seventh surface and the eighth surface.

The reason why the image height is low at the wide angle end is that the effective image pickup area in the wide angle focal length range is designed to have a barrel-like shape, which is transformed into a rectangular shape by image processing for correction of distortion.

In the following, numerical data of the above-described examples are presented. Among characters used in the numerical data, BF stands for the back focus, f1, f2, . . . are the focal lengths of the respective lens units, FNO stands for the f-number, ω is the half angle of view, WE stands for the wide angle end, ST stands for the intermediate focal length state, TE stands for the telephoto end, r is the radius of curvature of each lens surface, d is the distance between adjacent lens surfaces, nd is the refractive index of each lens with respect to the d-line, and vd is the Abbe constant of each lens with respect to the d-line. The overall length of the lens mentioned later is the sum of the distance from the frontmost lens surface to the last lens surface and the back focus. The back focus BF is the distance from the last lens surface to the paraxial image plane expressed in the equivalent air distance.

A shape of the aspheric surface is described by the following expression (I) using each aspherical surface coefficient in each embodiment, when Z is let to be an optical axis in which a light passing direction is let to be a positive direction, and Y is let to be a direction orthogonal to the optical axis.

$$Z=(Y^2/r)/[1+\{1-(K+1)(Y/r)^2\}^{1/2}]+A_4 Y^4 + A_6 Y^6 + A_8 Y^8 + A_{10} Y^{10} \quad (I)$$

where, r denotes a paraxial radius of curvature, K denotes a conical coefficient, $A_4$, $A_6$, $A_8$, and $A_{10}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Numerical Example 1

Unit mm

Surface data

| Surface no. | r | d | nd | νd |
|---|---|---|---|---|
| Object plane | ∞ | ∞ | | |
| 1 | 18.303 | 0.50 | 1.84666 | 23.78 |
| 2 | 15.054 | 0.10 | | |
| 3* | 11.627 | 3.72 | 1.43875 | 94.93 |
| 4* | −44.812 | Variable | | |
| 5 | −70.538 | 0.40 | 1.88300 | 40.80 |
| 6 | 5.656 | 1.71 | | |
| 7 | ∞ | 6.70 | 2.00100 | 29.13 |
| 8 | ∞ | 0.49 | | |
| 9* | −13.724 | 0.50 | 1.53071 | 55.69 |
| 10* | 9.583 | 0.37 | | |
| 11 | 14.974 | 1.30 | 1.94595 | 17.98 |
| 12 | ∞ | Variable | | |
| 13(stop) | ∞ | 0.00 | | |
| 14* | 5.180 | 2.13 | 1.67790 | 54.89 |
| 15* | −16.083 | 0.10 | | |
| 16 | 9.977 | 1.68 | 1.59282 | 68.63 |
| 17 | −8.000 | 0.40 | 1.91082 | 35.25 |
| 18 | 3.586 | 0.39 | | |
| 19* | 4.992 | 1.69 | 1.53071 | 55.69 |
| 20* | −14.186 | Variable | | |
| 21 | −18.869 | 0.40 | 1.51742 | 52.43 |
| 22 | 9.224 | Variable | | |
| 23* | −166.850 | 2.34 | 1.53071 | 55.69 |
| 24* | −6.251 | Variable | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.53 | | |
| Image plane (Light receiving surface) | ∞ | | | |

Aspherical surface data

3rd surface

K = 0.000
A4 = −3.31603e−05, A6 = −2.09934e−07, A8 = −1.24908e−10

4th surface

K = 0.000
A4 = 2.45900e−05, A6 = −6.30000e−08, A8 = 1.58750e−09

9th surface

K = 0.000
A4 = 9.64865e−04, A6 = −6.08359e−05, A8 = 1.94676e−06

10th surface

K = 0.000
A4 = 3.12555e−04, A6 = −6.48811e−05, A8 = 2.30921e−06

14th surface

K = 0.000
A4 = −3.47077e−04, A6 = 6.54444e−06, A8 = −8.33188e−07

15th surface

K = 0.000
A4 = 1.17143e−03, A6 = −3.01009e−05, A8 = 2.20031e−07

19th surface

K = 0.000
A4 = 2.14380e−03, A6 = 8.24279e−06, A8 = −5.84568e−06

20th surface

K = 0.000
A4 = 2.96958e−04, A6 = 8.26585e−05, A8 = −8.63939e−06

23th surface

K = 0.000
A4 = −1.07467e−03, A6 = 1.65913e−05, A8 = 9.15950e−07, A10 = −1.93203e−08

24th surface

K = 0.000
A4 = 3.23225e−04, A6 = 2.02201e−05, A8 = 4.39475e−07

Zoom data

| | WE | ST | TE |
|---|---|---|---|
| Focal length | 3.97 | 17.37 | 76.12 |
| Fno. | 2.81 | 4.98 | 6.97 |
| Angle of field 2ω | 75.93 | 18.76 | 4.44 |
| Image height | 2.70 | 3.00 | 3.00 |
| fb (in air) | 4.43 | 3.37 | 1.96 |
| Lens total length (in air) | 46.99 | 55.26 | 62.43 |
| d4 | 0.25 | 8.51 | 15.70 |
| d12 | 13.41 | 5.29 | 0.50 |
| d20 | 1.60 | 3.976 | 4.53 |
| d22 | 2.38 | 9.184 | 14.82 |
| d24 | 2.96 | 1.90 | 0.50 |

Unit focal length f1 = 27.04  f2 = −4.54  f3 = 8.13  f4 = −11.92  f5 = 12.18

Numerical Example 2

Unit mm

Surface data

| Surface no. | r | d | nd | νd |
|---|---|---|---|---|
| Object plane | ∞ | ∞ | | |
| 1 | 24.410 | 0.50 | 1.90200 | 25.10 |
| 2 | 18.176 | 0.19 | | |
| 3* | 12.109 | 4.05 | 1.49700 | 81.54 |
| 4* | −43.530 | Variable | | |
| 5 | −42.151 | 0.40 | 1.91082 | 35.25 |
| 6 | 5.930 | 1.60 | | |
| 7 | ∞ | 6.70 | 2.00100 | 29.13 |
| 8 | ∞ | 0.48 | | |
| 9* | −13.979 | 0.50 | 1.49700 | 81.54 |
| 10* | 9.383 | 0.40 | | |
| 11 | 15.609 | 1.42 | 1.94595 | 17.98 |
| 12 | ∞ | Variable | | |
| 13(stop) | ∞ | 0.00 | | |
| 14* | 5.133 | 2.11 | 1.67790 | 54.89 |
| 15* | −16.676 | 0.10 | | |
| 16 | 10.460 | 1.65 | 1.59282 | 68.63 |
| 17 | −8.000 | 0.40 | 1.91082 | 35.25 |
| 18 | 3.516 | 0.28 | | |
| 19* | 4.477 | 1.68 | 1.53071 | 55.69 |
| 20* | −16.826 | Variable | | |
| 21 | −24.315 | 0.42 | 1.51742 | 52.43 |
| 22 | 8.440 | Variable | | |
| 23* | −132.545 | 2.50 | 1.53071 | 55.69 |
| 24* | −6.084 | Variable | | |
| 25 | ∞ | 0.30 | 1.51633 | 64.14 |
| 26 | ∞ | 0.40 | | |
| 27 | ∞ | 0.50 | 1.51633 | 64.14 |
| 28 | ∞ | 0.53 | | |
| Image plane (Light receiving surface) | ∞ | | | |

Aspherical surface data

3rd surface

K = 0.000
A4 = −3.66280e−05, A6 = −6.24539e−08, A8 = 1.06168e−09

-continued

Unit mm

4th surface

K = 0.000
A4 = 2.38130e−05, A6 = 2.00470e−07, A8 = 6.75580e−10
9th surface

K = 0.000
A4 = 1.12960e−03, A6 = −6.05523e−05, A8 = 1.82682e−06
10th surface

K = 0.000
A4 = 3.85343e−04, A6 = −6.65161e−05, A8 = 2.19675e−06
14th surface

K = 0.000
A4 = −2.82961e−04, A6 = 8.19267e−06, A8 = −1.14295e−06
15th surface

K = 0.000
A4 = 1.29908e−03, A6 = −4.16760e−05, A8 = 3.07506e−07
19th surface

K = 0.000
A4 = 2.30386e−03, A6 = −2.71356e−05, A8 = −4.03388e−06
20th surface

K = 0.000
A4 = 4.13501e−04, A6 = 9.81893e−05, A8 = −7.26679e−06
23th surface

K = 0.000
A4 = −6.14257e−04, A6 = −4.63315e−05, A8 = 4.63575e−06,
A10 = −1.08578e−07
24th surface K = 0.000
A4 = 9.39564e−04, A6 = −1.90709e−05, A8 = 1.41302e−06

Zoom data

|  | WE | ST | TE |
|---|---|---|---|
| Focal length | 3.96 | 17.36 | 75.92 |
| Fno. | 2.83 | 5.13 | 6.97 |
| Angle of field 2ω | 76.25 | 18.77 | 4.41 |
| Image height | 2.70 | 3.00 | 3.00 |
| fb (in air) | 4.33 | 2.96 | 2.03 |
| Lens total length (in air) | 47.51 | 55.08 | 62.01 |
| d4 | 0.50 | 8.05 | 14.94 |
| d12 | 13.485 | 5.53 | 0.55 |
| d20 | 1.90 | 4.17 | 4.16 |
| d22 | 1.905 | 8.99 | 14.94 |
| d24 | 2.86 | 1.46 | 0.50 |

Unit focal length f1 = 25.64  f2 = −4.52  f3 = 8.19  f4 = −12.06  f5 = 11.93

FIGS. 3A to 3L are aberration diagrams of the zoom lens according to the first example in the state in which the zoom lens is focused on an object point at infinity. FIGS. 3A, 3B, 3C, and 3D respectively show spherical aberration (SA), astigmatism (AS), distortion (DT), and chromatic aberration of magnification (CC) of the zoom lens at the wide angle end. FIGS. 3E, 3F, 3G, and 3H respectively show spherical aberration, astigmatism, distortion, and chromatic aberration of magnification of the zoom lens in the intermediate focal length state. FIGS. 3I, 3J, 3K, and 3L respectively show spherical aberration, astigmatism, distortion, and chromatic aberration of magnification of the zoom lens at the telephoto end.

FIGS. 4A to 4L are aberration diagrams of the zoom lens according to the second example in the state in which the zoom lens is focused on an object point at infinity. FIGS. 4A, 4B, 4C, and 4D respectively show spherical aberration, astigmatism, distortion, and chromatic aberration of magnification of the zoom lens at the wide angle end. FIGS. 4E, 4F, 4G, and 4H respectively show spherical aberration, astigmatism, distortion, and chromatic aberration of magnification of the zoom lens in the intermediate focal length state. FIGS. 4I, 4J, 4K, and 4L respectively show spherical aberration, astigmatism, distortion, and chromatic aberration of magnification of the zoom lens at the telephoto end.

In aberration diagrams, FIY represents the largest image height, and ω represents the half angle of view.

Next, parameter and values of conditional expressions in each embodiments are described.

| Conditional expression | Example 1 | Example 2 |
|---|---|---|
| (1) −10 < f1/f2 < −5 | −5.95 | −5.68 |
| (2) 3 < f1/fw < 7.2 | 6.82 | 6.47 |
| (3) 3.5 < d1g/fw < 7 | 3.89 | 3.66 |
| (4) 1.8 < N2r < 2.3 | 2.001 | 2.001 |
| (5) 70 < ν1p | 94.93 | 81.54 |
| (6) 11.0 < ft/fw < 40.0 | 19.2 | 19.15 |

(Digital Camera)

The above-described zoom lens according to the present invention can be used in an electronic image pickup apparatus that picks up an image of an object formed by the zoom lens by receiving it by an electronic image pickup element such as a CCD, particularly in a digital camera, a video camera, or the like.

Figure 5A:
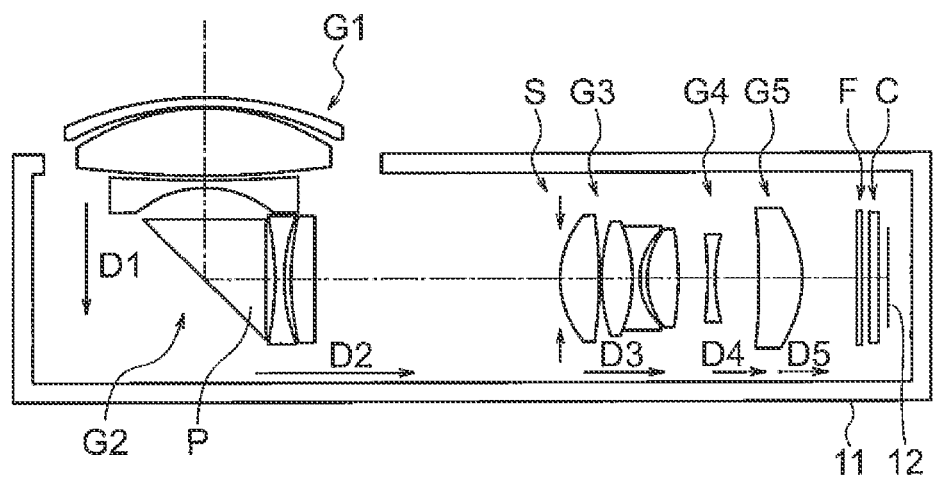
FIGS. 5A and 5B are cross sectional views of a digital camera equipped with a zoom lens according to the present invention, where
Figure 5B:
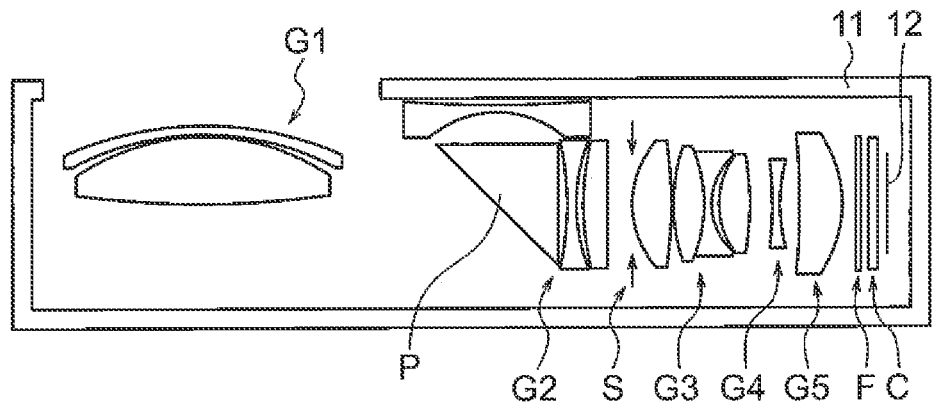

FIGS. 5A and 5B are cross sectional views of a digital camera equipped with a zoom lens according the present invention. FIG. 5A is a cross sectional view of the zoom lens at the wide angle end. FIG. 5B is a cross sectional view of the zoom lens in the collapsed state. In the digital camera 11 shown in FIGS. 5A and 5B, the image pickup surface 12 of the image pickup up element is disposed at the position of the image plane.

When the zoom lens is collapsed, firstly, the second lens unit G2, the third lens unit G3, the fourth lens unit G4, and the fifth lens unit G5 move toward the image pickup surface 12 along arrows D2, D3, D4, and D5 respectively. Thereafter, the first lens unit G1 moves into the digital camera 11 along arrow D1. In this way, the first lens unit G1 is collapsed or received in a space left by the shift of the second lens unit G2.

Figure 6:
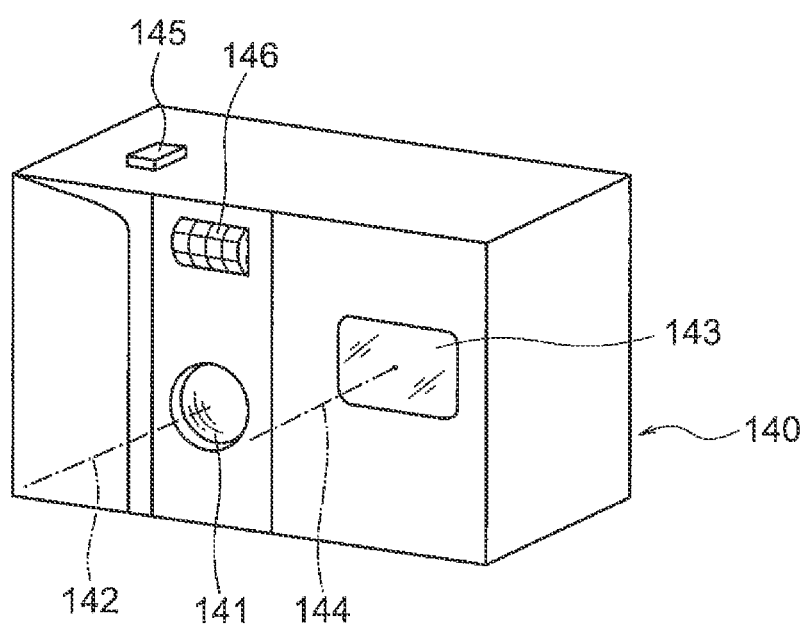
FIG. 6 is a front perspective view showing the outer appearance of the digital camera equipped with a zoom lens having a bent optical path according to the present invention.
Figure 7:
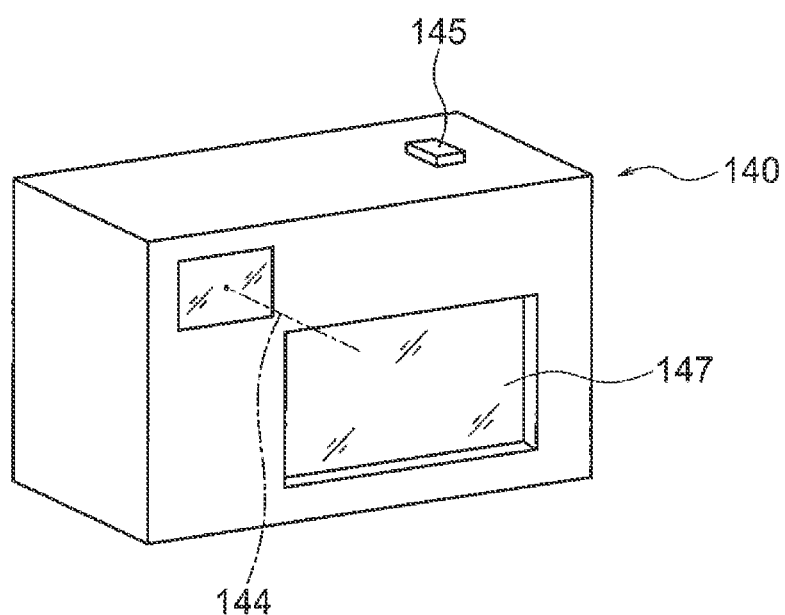
FIG. 7 is a rear perspective view of the digital camera.

FIGS. 6 to 8 schematically illustrate a digital camera equipped with a zoom lens as a taking optical system 141 according to the present invention. FIG. 6 is a front perspective view showing the outer appearance of the digital camera 140. FIG. 7 is a rear perspective view of the digital camera 140. FIG. 8 is a cross section diagram showing the construction of the digital camera 140. The digital camera 140 illustrated in the drawings has the taking optical system 141 having a taking optical path 142, a viewfinder optical system 143 having a viewfinder optical path 144, a shutter release button 145, a flash 146, and a liquid crystal display monitor 147. In response to depression of the shutter release button 145 provided on the top of the camera 140, shooting through the taking optical system 141, e.g. the zoom lens having a bent optical path according to the first embodiment, is effected. Specifically, an image of an object is formed by the taking optical system 141 on the image pickup surface of the CCD 149 through a near-infrared cut filter and an optical low pass filter F. The image of the object picked up by the CCD 149 is processed by a processing unit 151 and displayed as an electronic image on the liquid crystal display monitor 147 provided on the back of the camera. The processing unit 151 is connected with a storage unit 152, in which picked-up electronic images can be stored. The storage unit 152 may be provided separately from the processing unit 151. The storage unit 152 may be an electrically writable medium such as a flexible disk, memory card, or MO. The digital camera 140 may be constituted as a silver-halide camera provided with a silver film in place of the CCD 149.

A viewfinder objective optical system 153 is provided in the viewfinder optical path 144. An image of an object formed by the viewfinder objective optical system is formed in the viewfinder frame 157 of a Porro prism 155, which serves as an image erecting member. An eyepiece optical system 159 for delivering the erected image to the observer's eye E is provided in rear of the Porro prism 155. In addition, cover members 150 are provided at the entrance of the taking optical system 141, at the entrance of the viewfinder objective optical system, and at the exit of the eyepiece optical system respectively.

The taking optical system 141 of the digital camera 140 having the above-described construction is a zoom lens having a high zoom ratio of approximately 5, high speed, and high optical performance. Therefore, an inexpensive, high-performance digital camera that is very slim in depth can be realized.

The plane parallel plates or the cover members 150 in the digital camera illustrated in FIG. 8 may be eliminated.

(Internal Circuit Configuration)

Figure 9:
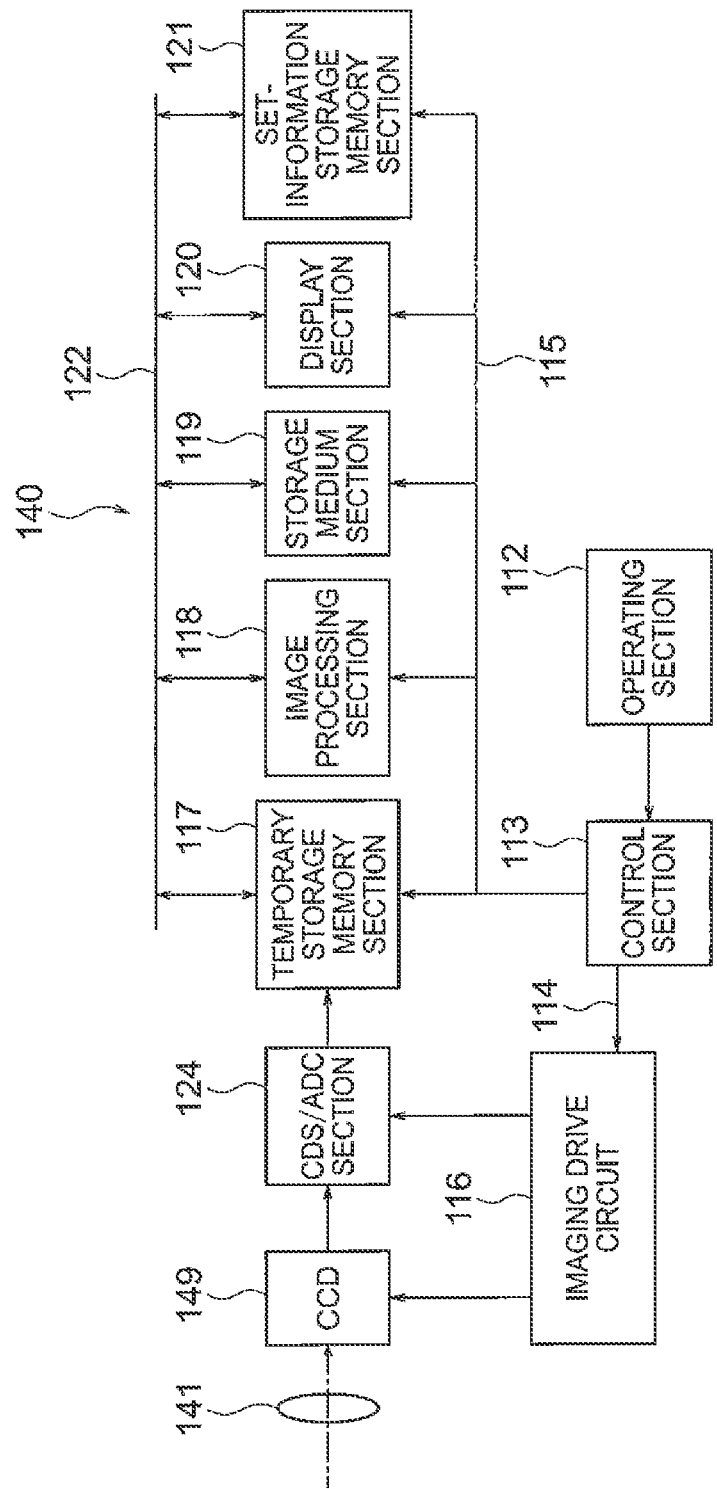
FIG. 9 is a block diagram showing the relevant internal circuit configuration of the digital camera.

FIG. 9 is a block diagram of the relevant portion of the internal circuit of the digital camera 140. In the case described here, the processing unit described above includes for instance, a CDS/ADC section 124, a temporary storage memory 117, and an image processing section 118, and the storage unit includes a storage medium 119 for example.

As shown in FIG. 9, the digital camera 140 has an operating section 112 and a control section 113 connected to the operating section 112, an image pickup drive circuit 116 connected to a control signal output port of the control section 113 via a bus 114, the temporary storage memory 117, the image processing section 118, the storage medium 119, a display section 120, and a set-information storage memory section 121. The temporary storage memory 117, the image processing section 118, the storage medium 119, the display section 120, and the set-information storage memory section 121 are connected to control signal output ports of the control section 113 via bus 115.

The temporary storage memory 117, the image processing section 118, the storage medium section 119, the display section 120, and the set-information storage memory section 121 are configured to be capable of mutually inputting and outputting data via a bus 122. Moreover, the CCD 149 and the CDS/ADC section 124 are connected to the image pickup drive circuit 116.

The operating section 112 is a circuit equipped with various entry buttons and switches. The operating section 112 notifies the control section of event information entered from outside (by a user of the camera) through the entry buttons and switches.

The control section 113 is, for example, a central processing unit (CPU) and has a built-in program memory, which is not shown in the drawings. The control section 113 is a circuit that controls the entire digital camera 140 according to a program stored in the program memory, in response to instructions and commands entered by the user of the camera through the operating section 112.

The CCD 149 receives an image of the object formed by the taking optical system 141 according to the present invention. The CCD 149 is an image pickup element that is driven and controlled by the image pickup drive circuit 116 to convert the quantity of light of the object image into an electrical signal on a pixel-by-pixel basis and output it to the CDS/ADC section 124.

The CDS/ADC section 124 is a circuit that amplifies the electrical signal input from the CCD 149, performs analog-to-digital conversion, and outputs to the temporary storage memory 117 raw image data (or Bayer data, which will be hereinafter referred to as "RAW data") that has undergone only amplification and digital conversion.

The temporary storage memory 117 serves as a buffer and may consist of an SDRAM for example. The temporary storage memory 117 is a memory device that temporarily stores the RAW data output from the CDS/ADC section 124. The image processing section 118 is a circuit that reads the RAW data stored in the temporary storage memory 117 or the RAW data stored in the storage medium section 119 and performs various electrical image processing including distortion correction based on image-quality parameters specified by the control section 113. The image processing section 118 electrically corrects a distortion of the image received by the CCD 149.

The storage medium section 119 allows a detachable mounting of a recording medium such as, for example, a card-type or stick-type flash memory. The storage medium section 119 is a control circuit of the apparatus that records or writes RAW data transferred from the temporary storage memory 117 and image data having been processed in the image processing section 118 in the card-type or stick-type flash memory to have the data stored in it.

The display section 120 is equipped with the liquid-crystal display monitor and causes it to display images and operation menu etc. The set-information storage memory section 121 includes a ROM section in which various image-quality parameters are stored in advance and a RAM section for storing image quality parameters selected by an entry made through the operating section 112 from among the image quality parameters read from the ROM section. The set-information storage memory section 121 is a circuit that controls the input/output to/from the memories.

The taking lens system 141 of the digital camera 140 having the above-described construction has a high zoom ratio and very reliable imaging performance throughout the entire focal length range while being compact and having a sufficiently wide angle of view. Thus, the digital camera 140 can have excellent performance, a small size, and a wide angle of view. Moreover, the digital camera 140 can perform fast focusing operation in both the wide angle and telephoto focal length ranges.

As described above, the zoom lens according to the present invention is useful when a reduction in its thickness in shooting in the wide angle focal length range is to be achieved and a sufficiently high zoom ratio is to be achieved.

The zoom lens according to the present invention is advantageous in achieving a sufficiently high zoom ratio and having a small thickness when shooting in the wide angle focal length range.

What is claimed is:

1. A zoom lens comprising, in order from the object side to the image side along its optical path:
 a first lens unit having a positive refractive power;
 a second lens unit having a negative refractive power and comprising a prism reflecting member having an entrance refracting surface, an exit refracting surface, and a reflecting surface disposed in the optical path between the entrance refracting surface and the exit refracting surface and oriented obliquely to the optical axis to bend the optical path;
a third lens unit having a positive refractive power;
a fourth lens unit having a negative refractive power; and
a fifth lens unit having a positive refractive power, wherein
the distances between the lens units vary during zooming from the wide angle end to the telephoto end,
the first lens unit and the third lens unit are located closer to the ray incidence side at the telephoto end than at the wide angle end,
the position of the second lens unit is fixed during zooming from the wide angle end to the telephoto end, and
the first lens unit consists of two lenses at most.

2. The zoom lens according to claim 1, wherein the following conditional expressions (2) and (3) are satisfied:

$$3 < f_1/f_w < 7.2 \quad (2), \text{ and}$$

$$3.5 < d_{1g}/f_w < 7 \quad (3),$$

where $f_w$ is the focal length of the entire zoom lens system at the wide angle end in the state in which the zoom lens is focused at infinity, and $d_{1g}$ is the amount of displacement of the position of the first lens unit at the telephoto end from its position at the wide angle end.

3. The zoom lens according to claim 1, wherein the following conditional expression (4) is satisfied:

$$1.8 < N_{2r} < 2.3 \quad (4),$$

where $N_{2r}$ is the refractive index of the prism reflecting member in the second lens unit with respect to the d-line.

4. The zoom lens according to claim 1, wherein the first lens unit consists, in order from the object side, of a negative lens and at least one positive lens having an Abbe constant with respect to the d-line larger than that of the negative lens and satisfies the following conditional expression (5):

$$70 < v_{1p} \quad (5),$$

where $v_{1p}$ is the Abbe constant with respect to the d-line of a positive lens among the at least one positive lens in the first lens unit, the Abbe constant $v_{1p}$ being expressed by $v_{1p} = (n_{d1p} - 1)/(n_{F1p} - n_{C1p})$, where $n_{d1p}$ is the refractive index of the positive lens with respect to the d-line, $n_{C1p}$ is the refractive index of the aforementioned positive lens with respect to the C-line, and $n_{F1p}$ is the refractive index of the aforementioned positive lens with respect to the F-line.

5. The zoom lens according to claim 1, wherein the fourth lens unit moves toward the image side during focusing from infinity to a very short distance.

6. The zoom lens according to claim 1, wherein the following conditional expression (6) is satisfied:

$$11.0 < f_t/f_w < 40.0 \quad (6),$$

where $f_t$ is the focal length of the entire zoom lens system at the telephoto end in the state in which the zoom lens is focused at infinity, and $f_w$ is the focal length of the entire zoom lens system at the wide angle end in the state in which the zoom lens is focused at infinity.

7. The zoom lens according to claim 1, wherein the fourth lens unit consists of one negative lens.

8. The zoom lens according to claim 1, wherein the second lens unit and the third lens unit are shifted toward the image side from their position at the wide angle end to allow the first lens unit to collapse into a space generated by the shift of the second lens unit.

9. An image pickup apparatus comprising:
a zoom lens according to claim 1; and
an image pickup element that converts an image formed by the zoom lens into an electrical signal.

10. The zoom lens according to claim 1, wherein the following conditional expression (1) is satisfied:

$$-10 < f_1/f_2 < -5 \quad (1),$$

where $f_1$ is the focal length of the first lens unit, and $f_2$ is the focal length of the second lens unit.

11. A zoom lens comprising, in order from the object side to the image side along its optical path:
a first lens unit having a positive refractive power;
a second lens unit having a negative refractive power and comprising a prism reflecting member having an entrance refracting surface, an exit refracting surface, and a reflecting surface disposed in the optical path between the entrance refracting surface and the exit refracting surface and oriented obliquely to the optical axis to bend the optical path;
a third lens unit having a positive refractive power;
a fourth lens unit having a negative refractive power; and
a fifth lens unit having a positive refractive power, wherein
the distances between the lens units vary during zooming from the wide angle end to the telephoto end,
the first lens unit and the third lens unit are located closer to the ray incidence side at the telephoto end than at the wide angle end,
the position of the second lens unit is fixed during zooming from the wide angle end to the telephoto end, and
the following conditional expressions (1), (2), and (3) are satisfied:

$$-10 < f_1/f_2 < -5 \quad (1),$$

$$3 < f_1/f_w < 7.2 \quad (2), \text{ and}$$

$$3.5 < d_{1g}/f_w < 7 \quad (3),$$

where $f_1$ is the focal length of the first lens unit, $f_2$ is the focal length of the second lens unit, $f_w$ is the focal length of the entire zoom lens system at the wide angle end in the state in which the zoom lens is focused at infinity, and $d_{1g}$ is the amount of displacement of the position of the first lens unit at the telephoto end from its position at the wide angle end.

12. The zoom lens according to claim 11, wherein the first lens unit comprises two lenses at most.

13. The zoom lens according to claim 11, wherein the following conditional expression (4) is satisfied:

$$1.8 < N_{2r} < 2.3 \quad (4),$$

where $N_{2r}$ is the refractive index of the prism reflecting member in the second lens unit with respect to the d-line.

14. The zoom lens according to claim 11, wherein the first lens unit consists, in order from the object side, of a negative lens and at least one positive lens having an Abbe constant with respect to the d-line larger than that of the negative lens and satisfies the following conditional expression (5):

$$70 < v_{1p} \quad (5),$$

where $v_{1p}$ is the Abbe constant with respect to the d-line of a positive lens among the at least one positive lens in the first lens unit, the Abbe constant $v_{1p}$ being expressed by $v_{1p} = (n_{d1p} - 1)/(n_{F1p} - n_{C1p})$, where $n_{d1p}$ is the refractive index of the positive lens with respect to the d-line, $n_{C1p}$ is the refractive index of the aforementioned positive lens with respect to the C-line, and $n_{F1p}$ is the refractive index of the aforementioned positive lens with respect to the F-line.

15. The zoom lens according to claim 11, wherein the following conditional expression (6) is satisfied:

$$11.0 < f_t/f_w < 40.0 \quad (6),$$

where $f_t$ is the focal length of the entire zoom lens system at the telephoto end in the state in which the zoom lens is focused at infinity, and $f_w$ is the focal length of the entire zoom lens system at the wide angle end in the state in which the zoom lens is focused at infinity.

16. The zoom lens according to claim 11, wherein the fourth lens unit consists of one negative lens.

17. The zoom lens according to claim 11, wherein the second lens unit and the third lens unit are shifted toward the image side from their position at the wide angle end to allow the first lens unit to collapse into a space generated by the shift of the second lens unit.

18. An image pickup apparatus comprising:
a zoom lens according to claim 11; and
an image pickup element that converts an image formed by the zoom lens into an electrical signal.

19. A zoom lens comprising, in order from the object side to the image side along its optical path:
a first lens unit having a positive refractive power;
a second lens unit having a negative refractive power and comprising a prism reflecting member having an entrance refracting surface, an exit refracting surface, and a reflecting surface disposed in the optical path between the entrance refracting surface and the exit refracting surface and oriented obliquely to the optical axis to bend the optical path;
a third lens unit having a positive refractive power;
a fourth lens unit having a negative refractive power; and
a fifth lens unit having a positive refractive power, wherein
the distances between the lens units vary during zooming from the wide angle end to the telephoto end,
the first lens unit and the third lens unit are located closer to the ray incidence side at the telephoto end than at the wide angle end,
the position of the second lens unit is fixed during zooming from the wide angle end to the telephoto end,
the fourth lens unit moves toward the image side during focusing from infinity to a very short distance, and
the following conditional expression (1) is satisfied:

$$-10 < f_1/f_2 < -5 \qquad (1),$$

where $f_1$ is the focal length of the first lens unit, and $f_2$ is the focal length of the second lens unit.

20. The zoom lens according to claim 19, wherein the following conditional expressions (2) and (3) are satisfied:

$$3 < f_1/f_w < 7.2 \qquad (2), \text{ and}$$

$$3.5 < d_{1g}/f_w < 7 \qquad (3),$$

where $f_w$ is the focal length of the entire zoom lens system at the wide angle end in the state in which the zoom lens is focused at infinity, and $d_{1g}$ is the amount of displacement of the position of the first lens unit at the telephoto end from its position at the wide angle end.

21. The zoom lens according to claim 19, wherein the following conditional expression (4) is satisfied:

$$1.8 < N_{2r} < 2.3 \qquad (4),$$

where $N_{2r}$ is the refractive index of the prism reflecting member in the second lens unit with respect to the d-line.

22. The zoom lens according to claim 19, wherein the first lens unit consists, in order from the object side, of a negative lens and at least one positive lens having an Abbe constant with respect to the d-line larger than that of the negative lens and satisfies the following conditional expression (5):

$$70 < v_{1p} \qquad (5),$$

where $v_{1p}$ is the Abbe constant with respect to the d-line of a positive lens among the at least one positive lens in the first lens unit, the Abbe constant $v_{1p}$ being expressed by $v_{1p} = (n_{d1p}-1)/(n_{F1p}-n_{C1p})$, where $n_{d1p}$ is the refractive index of the positive lens with respect to the d-line, $n_{C1p}$ is the refractive index of the aforementioned positive lens with respect to the C-line, and $n_{F1p}$ is the refractive index of the aforementioned positive lens with respect to the F-line.

23. The zoom lens according to claim 19, wherein the following conditional expression (6) is satisfied:

$$11.0 < f_t/f_w < 40.0 \qquad (6),$$

where $f_t$ is the focal length of the entire zoom lens system at the telephoto end in the state in which the zoom lens is focused at infinity, and $f_w$ is the focal length of the entire zoom lens system at the wide angle end in the state in which the zoom lens is focused at infinity.

24. The zoom lens according to claim 19, wherein the first lens unit comprises two lenses at most.

25. The zoom lens according to claim 19, wherein the fourth lens unit consists of one negative lens.

26. The zoom lens according to claim 19, wherein the second lens unit and the third lens unit are shifted toward the image side from their position at the wide angle end to allow the first lens unit to collapse into a space generated by the shift of the second lens unit.

27. An image pickup apparatus comprising:
a zoom lens according to claim 19; and
an image pickup element that converts an image formed by the zoom lens into an electrical signal.

28. A zoom lens comprising, in order from the object side to the image side along its optical path:
a first lens unit having a positive refractive power;
a second lens unit having a negative refractive power and comprising a prism reflecting member having an entrance refracting surface, an exit refracting surface, and a reflecting surface disposed in the optical path between the entrance refracting surface and the exit refracting surface and oriented obliquely to the optical axis to bend the optical path;
a third lens unit having a positive refractive power;
a fourth lens unit having a negative refractive power; and
a fifth lens unit having a positive refractive power, wherein
during zooming from the wide angle end to the telephoto end, the distances between the lens units vary,
the first lens unit and the third lens unit are located closer to the ray incidence side at the telephoto end than at the wide angle end,
the position of the second lens unit is fixed during zooming from the wide angle end to the telephoto end,
the fourth lens unit moves toward the image side during focusing from infinity to a very short distance, and
the fourth lens unit consists of one negative lens.

29. The zoom lens according to claim 28, wherein the following conditional expressions (2) and (3) are satisfied:

$$3 < f_1/f_w < 7.2 \qquad (2), \text{ and}$$

$$3.5 < d_{1g}/f_w < 7 \qquad (3),$$

where $f_w$ is the focal length of the entire zoom lens system at the wide angle end in the state in which the zoom lens is focused at infinity, and $d_{1g}$ is the amount of displacement of the position of the first lens unit at the telephoto end from its position at the wide angle end.

30. The zoom lens according to claim 28, wherein the following conditional expression (4) is satisfied:

$$1.8 < N_{2r} < 2.3 \qquad (4),$$

where $N_{2r}$ is the refractive index of the prism reflecting member in the second lens unit with respect to the d-line.

31. The zoom lens according to claim 28, wherein the first lens unit consists, in order from the object side, of a negative lens and at least one positive lens having an Abbe constant with respect to the d-line larger than that of the negative lens and satisfies the following conditional expression (5):

$$70 < v_{1p} \tag{5}$$

where $v_{1p}$ is the Abbe constant with respect to the d-line of a positive lens among the at least one positive lens in the first lens unit, the Abbe constant $v_{1p}$ being expressed by $v_{1p} = (n_{d1p}-1)/(n_{F1p}-n_{C1p})$, where $n_{d1p}$ is the refractive index of the positive lens with respect to the d-line, $n_{C1p}$ is the refractive index of the aforementioned positive lens with respect to the C-line, and $n_{F1p}$ is the refractive index of the aforementioned positive lens with respect to the F-line.

32. The zoom lens according to claim 28, wherein the following conditional expression (6) is satisfied:

$$11.0 < f_t/f_w < 40.0 \tag{6}$$

where $f_t$ is the focal length of the entire zoom lens system at the telephoto end in the state in which the zoom lens is focused at infinity, and $f_w$ is the focal length of the entire zoom lens system at the wide angle end in the state in which the zoom lens is focused at infinity.

33. The zoom lens according to claim 28, wherein the first lens unit comprises two lenses at most.

34. The zoom lens according to claim 28, wherein the second lens unit and the third lens unit are shifted toward the image side from their position at the wide angle end to allow the first lens unit to collapse into a space generated by the shift of the second lens unit.

35. An image pickup apparatus comprising:
a zoom lens according to claim 28; and
an image pickup element that converts an image formed by the zoom lens into an electrical signal.

* * * * *